(12) United States Patent
Poynter

(10) Patent No.: US 9,550,511 B2
(45) Date of Patent: Jan. 24, 2017

(54) HEIGHT EXTENDER FOR CONTROL ARM SKATE

(71) Applicant: James R. Poynter, Bellevue, KY (US)

(72) Inventor: James R. Poynter, Bellevue, KY (US)

( * ) Notice: Subject to any disclaimer, the term of this patent is extended or adjusted under 35 U.S.C. 154(b) by 0 days.

(21) Appl. No.: 14/743,326

(22) Filed: Jun. 18, 2015

(65) Prior Publication Data

US 2015/0369420 A1 Dec. 24, 2015

Related U.S. Application Data

(60) Provisional application No. 62/014,758, filed on Jun. 20, 2014.

(51) Int. Cl.
| | |
|---|---|
| *B62B 13/18* | (2006.01) |
| *B62D 33/00* | (2006.01) |
| *B62D 63/00* | (2006.01) |
| *B60T 3/00* | (2006.01) |
| *B60T 1/14* | (2006.01) |
| *B66F 17/00* | (2006.01) |
| *F16P 3/00* | (2006.01) |

(52) U.S. Cl.
CPC ............. *B62B 13/18* (2013.01); *B60T 1/14* (2013.01); *B60T 3/00* (2013.01); *B62D 33/00* (2013.01); *B62D 63/00* (2013.01); *B66F 17/00* (2013.01); *F16P 3/00* (2013.01)

(58) Field of Classification Search
CPC .......... B62B 13/18; B62B 13/16; B62B 19/00; B62B 19/02; B62B 19/04; B62B 13/02; B62D 63/00; B62D 33/00; B60T 1/14; B60T 3/00; B66F 17/00; F16P 3/00
USPC ................ 280/7.1, 7.12, 7.13, 7.14; 180/183
IPC ......................................................... F16P 3/00
See application file for complete search history.

(56) References Cited

U.S. PATENT DOCUMENTS

| | | | | |
|---|---|---|---|---|
| 3,756,615 | A * | 9/1973 | Bray ....................... | B62B 13/18 280/14 |
| 4,869,336 | A * | 9/1989 | Nakasaki ................ | B62B 13/04 180/196 |
| 6,474,660 | B1 * | 11/2002 | Warren ................... | B62K 3/002 280/14.25 |
| 8,418,792 | B2 * | 4/2013 | Rivard .................... | B62B 19/02 180/182 |
| 8,777,234 | B2 | 7/2014 | Poynter | |

\* cited by examiner

*Primary Examiner* — John Walters
(74) *Attorney, Agent, or Firm* — Wood Herron & Evans LLP

(57) ABSTRACT

A height extender for a control arm skate has an upper face configured to receive a control arm of a vehicle and a lower face configured to engage with an upper face of an underlying control arm skate. Extenders may be stacked.

14 Claims, 9 Drawing Sheets

HEIGHT EXTENDER FOR CONTROL ARM SKATE

PRIORITY CLAIM

Priority of the U.S. Provisional Application Ser. No. 62/014,758, filed Jun. 20, 2014 is claimed and that application incorporated herein in its entirety by this reference.

FIELD OF THE INVENTION

This invention relates to control arm skates and more particularly to accessories and improvements for control arm skates including extenders for the operative height of control arm skates.

BACKGROUND OF THE INVENTION

A control arm skate is described in U.S. Provisional Patent Application, Ser. No. 61/519,528 filed May 24, 2011 and in a related U.S. Utility application Ser. No. 13/479,996, filed May 24, 2012, claiming priority to the Provisional, both of which applications are herewith incorporated by reference as if fully set out herein.

A control arm skate is thus used, as an example, in supporting a component of a vehicle above a reference or sliding surface and in facilitating the movement or sliding of a vehicle over the surface. In use, a vehicle is lifted then lowered onto at least one control arm skate, with a portion of the vehicle, such as a control arm or other suspension component, supported onto the skate. The vehicle can then be transported or slid across the reference surface, the skate sliding thereon while supporting the vehicle.

It will be recognized that the skate has a lower sliding surface and an upper face preferably configured compatibly to receive a vehicle component such as a control arm.

Since the skate is of predetermined thickness, the operative height of the supported vehicle portion or part above the surface reference on which the skate sits is essentially determined by the operative thickness of the skate between the surface on one hand and a lower part of the supported portion of the vehicle. The distance or height so determined may not be high enough as desired.

It is thus one objective of this invention to provide an accessory or improvement for a control arm skate where the height of a vehicle component it supports above a surface is not limited by the operative thickness of the skate as described above.

More particularly, where a skate is to be used to support a vehicle above a surface, it is desired to operably dispose a skate under another suspension part or component than the control arm. Variations in vehicles, types, status, damage or the like can require support of the vehicle by engagement of a part thereof other than a suspension control arm. It might thus be desired to support, for example, a vehicle by supporting an axle or frame member on a skate. However, such a member, relative to the vehicle, may be higher or above the lowest portion of a control arm component. In such a case, the skate disposed under an axle or frame, for example, may be of such insufficient operative thickness to adequately support the vehicle the desired distance above the reference surface.

Accordingly, it is another objective of the invention to provide apparatus for combination with a skate to provide support of a vehicle component above that provided by the operative thickness of an unmodified skate.

As well, a further objective of the invention has been to provide methods and apparatus enabling a skate to support a vehicle component at varied, selected distances above a reference or sliding surface.

Finally, it is noted that a control arm skate preferably has an upper surface configured to receive a particular compatible vehicle component such as a control arm. It is desirable to provide an apparatus for a skate to present an upper surface for receiving a control arm and alternate apparatus for a skate for receiving another component, in supporting relation, of different configuration than a control arm, with both offering a variation of operative heights.

SUMMARY OF THE INVENTION

A preferred embodiment of the invention thus contemplates a height extender for operative combination with a control arm skate which has an upper face configured to receive a control arm, and wherein the extender has a lower face configured compatibly with the control arm upper face, and wherein the extender has an upper face surface configured for compatible operative engagement with a control arm, above the upper surface of the skate. Alternatively, the invention contemplates a modified height extender as here described, excepting its upper face is configured to operatively and compatibly receive an axle, frame or vehicle component other than a control arm, but with a lower face as noted above.

The invention also contemplates methods for supporting vehicle components above the upper face of a control arm skate and at a variety of different heights above a reference or sliding surface over which a supported vehicle is to be slid. A plurality of height extenders can be stacked on the skate to provide different support heights above the reference surface.

DETAILED DESCRIPTION OF THE INVENTION

Figure 1:
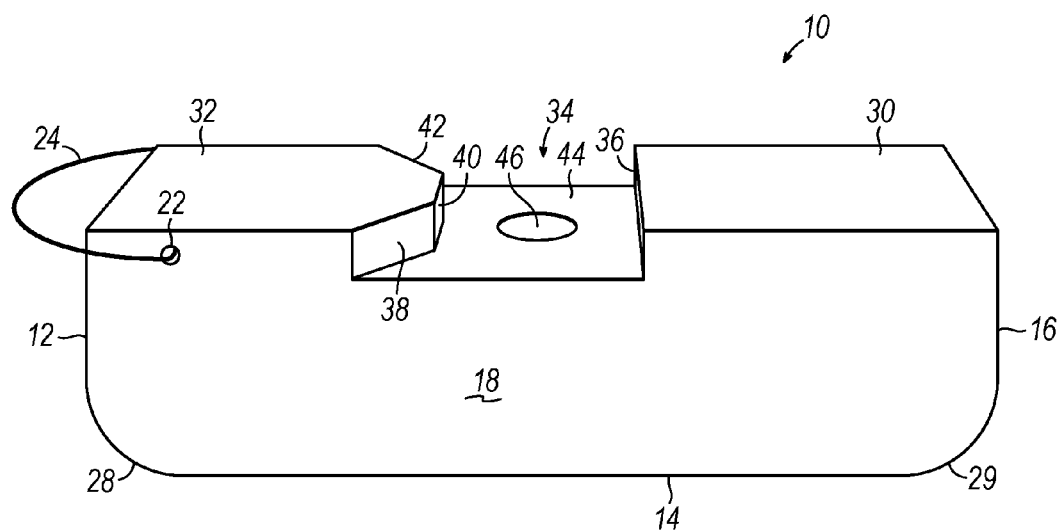
FIG. 1 is a perspective view of the control arm skate to which the height extenders of the invention will be applied.
Figure 2:
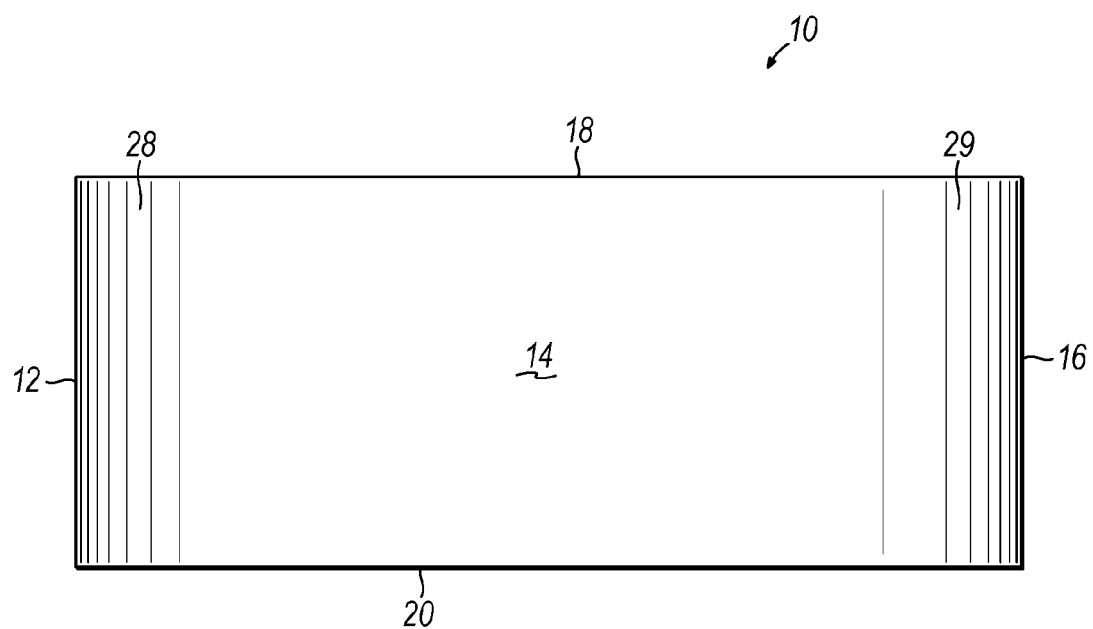
FIG. 2 is a bottom view of the control arm skate of FIG. 1.
Figure 3:
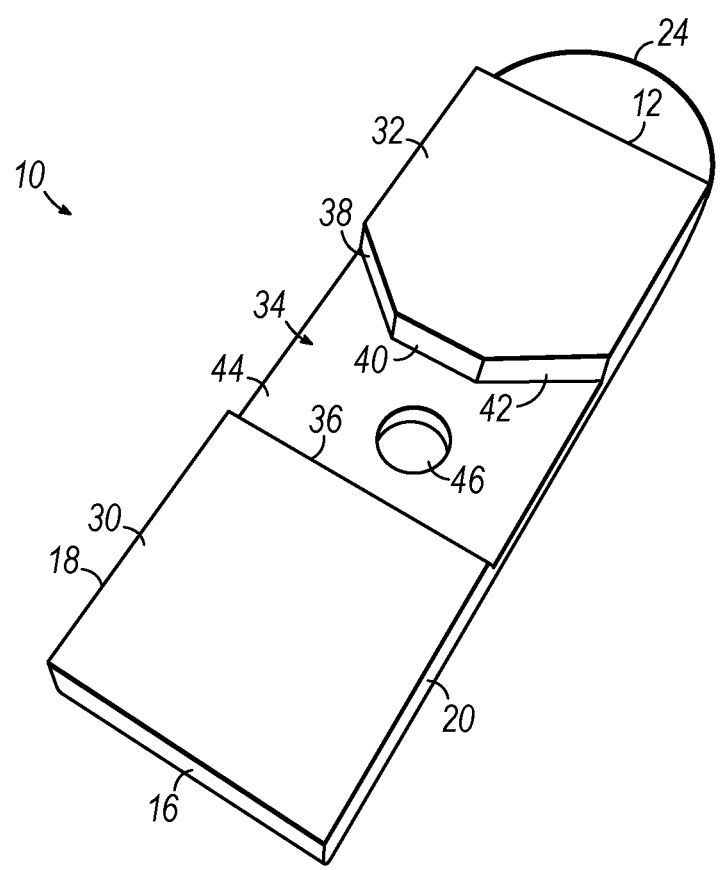
FIG. 3 is a top isometric view of the control arm skate of FIGS. 1 and 2.

Turning to the Figures, a control arm skate used in connection with height extenders of the invention is shown in detail in FIGS. 1-3. That skate is further shown with the height extenders of the invention hereafter described with reference to FIGS. 4-11.

The skate 10 is shown in FIGS. 1-3 may be used alone where the desired height of the supported vehicle component above a reference, support or sliding surface is sufficiently produced by the thickness of the skate 10 between its lower surface 14 and its upper surfaces 30, 32 and 44, further described.

For purposes of this application skate 10 is of the same configuration for use with all alternate height extenders described herein.

The preferred skate includes a monolithic main body or block 10 of preferably synthetic material such as plastic having a preferably relatively low co-efficient of friction (as compared to wood, for example) to facilitate sliding over a support surface such as asphalt, concrete, aluminum, steel, other plastic or the like as may be found, for example, on a roadway, transport vehicle, repair or storage facility or the like. Preferably recycled polypropylene is used.

Other materials could be used, such as virgin plastic, wood, compressed wood, and/or mixtures of various materials though without certain of the advantages noted herein. However, the suggested material will not absorb oils and is not subject to splintering and deterioration as is wood.

Block 10 has a lower surface 14, two ends 12 and 16 and two sides 18, 20. Preferably the block 10 may be about 18 inches long and about 6 inches wide and 6 inches tall.

A through-hole 22 accommodates a handle 24 such as a flexible wire attached to block 10 for handling, carrying or moving block 10 manually. Wire 24 is not intended for pulling block 10 when it bears weight of a vehicle.

Ends 12, 16 of block 10 are inclined, meaning tapered, radiused or rounded, respectively at 28, 29 from the ends 12, 16 respectively, to bottom or lower surface 14 providing a sled-like or runner configuration to facilitate sliding of block surface 14 across or along a support surface. Due to both inclined ends, the block 10 is unidirectional in function and a vehicle on which it rests can be moved or slid in opposite directions.

The material of block 10 is selected that the block has a crush resistance sufficient to withstand the vehicle weight applied to it when supporting the lower surface of a damaged or disabled part like an axle, control arm, joint, wheel assembly or the like.

Block 10 has an upper surface or face, as shown, of multiple configurations. These configurations are selected to receive the known shapes of standard automotive parts and also to receive misshapen parts resulting from a wreck, collision, part collapse or failure or the like. The figures illustrate but several of the upper surface configurations and shapes of block 10. Neither the block size nor the configurations are limited, and can be of any suitable size or shapes.

In particular, the upper surface or face of one embodiment of block 10 is shown in FIGS. 1 and 3. There are two relatively flat surfaces 30, 32 lying in essentially the same plane but spaced apart. A transverse channel 34 extends across the width of body 10 between surfaces 30, 32. Channel 34 is defined on one side by vertical surface 36. The other side of channel 34 comprises multiple surfaces 38, 40 and 42. Surfaces 38, 42 are inclined toward end 12 of block 10, while surface 40 is in a plane parallel to surface 36. Channel 34 has a flat bottom surface 44.

A circular recess 46 of any suitable diameter and depth is defined in surface 44 and block 10.

The particular configuration of the upper face of block 10 is suitable to receive the lower surface of a damaged or disabled vehicle, such as a ball joint, axle, control arm, wheel assembly or other vehicle part, and to be held by such parts when the vehicle is supported on the block 10 and is moved so as to slide block 10 along a supporting surface. The upper face configurations engaging a vehicle cause block 10 to slide when the vehicle is pulled; it cannot slide off the block 10.

In use, with skate alone, a damaged vehicle is lifted or jacked up a distance to accommodate placement of block 10 under a component of the vehicle. The vehicle is lowered onto the block 10, that block receiving one or more vehicle parts.

Thereafter, the vehicle is slid, winched or pulled across a supporting surface, such as a roadway, then up onto a supporting surface, such as a surface of a rescue vehicle bed. As the vehicle is pulled, block 10, facilitated by its composition, by inclined ends 28 or 29 (whichever leads) and surface 14, slides along, pulled by the engagement of a vehicle part on one or more of the surfaces of the upper face of block 10.

Thus, in a typical vehicle disablement situation, a tow is called for. An operator arrives to tow the vehicle with a tow truck equipped with the proper lift and tow device or what is known in the industry as a flatbed/rollback/tilt tray/carrier or a trailer attached to a towing vehicle. The flatbed has become the vehicle of choice in recent years because of it versatility, but it does have its limitations. When the flatbed operator arrives on the scene of this type of disablement he or she needs to be able to load the vehicle onto the flatbed, transport it to a place of repair or temporary storage and unload without further damage to the disabled vehicle or to the flatbed upper surface. Many flatbeds are fabricated from aluminum or other material that is easily damaged by sliding thereon of broken, jagged parts on the wrecked/disabled vehicle if some means of protection is not provided during loading and unloading.

The disabled vehicle is raised to a height sufficient for the block 10 to be placed under the lower surface of the lowest part, usually the control arm, ball joint or axle then the vehicle lowered onto the invention. As the vehicle is lowered onto block 10, the height of block 10 preferably returns the vehicle to approximately the same height as before disablement. The vehicle can now be drawn onto the flatbed's upper surface using the standard winch and wire rope assembly provided.

The width of block 10 is sufficient to support broken or defective parts of the automobile during the loading and unloading process without tipping to either side. The length of block 10 provides support while traversing uneven surfaces encountered in the loading and unloading process. The height of block 10 provides sufficient clearance in some cases between the damaged and undamaged parts of the disabled vehicle to assure ease of loading and unloading without further damage. The channel 34 and other upper face configurations of block 10 accept, support and help maintain the damaged parts in the desired position as a single unit during the loading and unloading process. The combination of the upper surface configurations accommodate not only the known shape of standard automotive parts but many inconceivable shapes after wrecks and disablement. The inclined areas 28, 29 are provided to enable the damaged vehicle to be moved to and from the transport vehicle, by providing a lifting action when encountering a minor obstruction such the blunt end of the transport vehicle apparatus.

Typically, only one block 10 is used, for example, under the left or right front or rear wheel area of a vehicle. Two blocks 10 or more could be used to support other vehicle portions. Otherwise, non-disabled wheels and tires support other vehicle portions when the vehicle, supported in part by at least one block 10, is moved.

Turning now to FIGS. 4-8, there is depicted a height extender 60 according to this invention, and for use with a skate or block 10 as described above. Extender 60 comprises a block of material similar to that of the skate 10. Extender 60 has lower surfaces 62, 64 and a depending projection 66 having a lower surface 68. It will be appreciated that both extenders 60 of FIG. 4 and extender 60A of FIG. 5 have similar bottom configurations with surfaces 62, 64, 68 even though the top face configurations of extenders 60, 60A are varied as described below.

Figure 6:
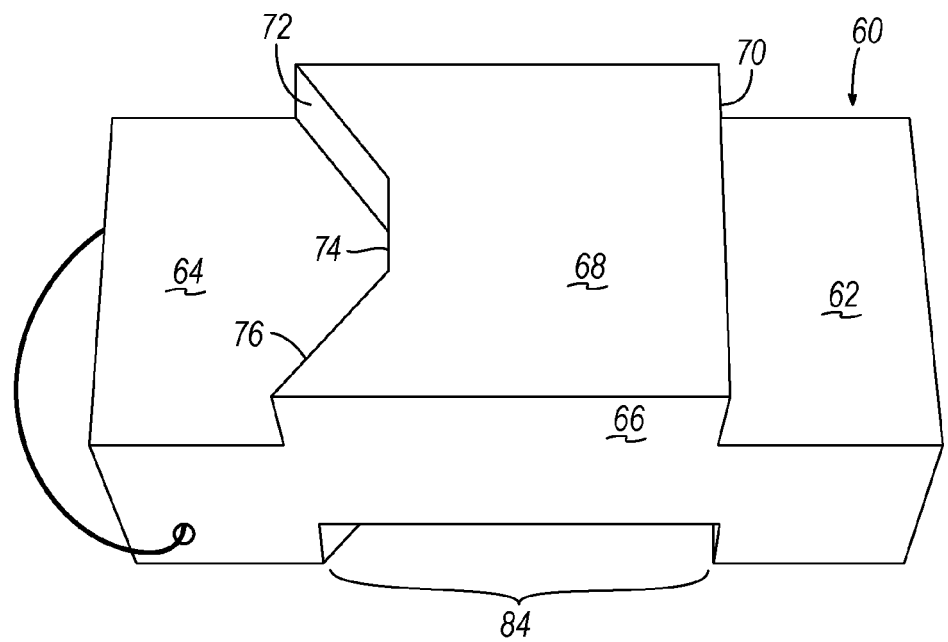
FIG. 6 is an illustrative view of the bottom of the height extender of FIG. 4.
Figure 7:
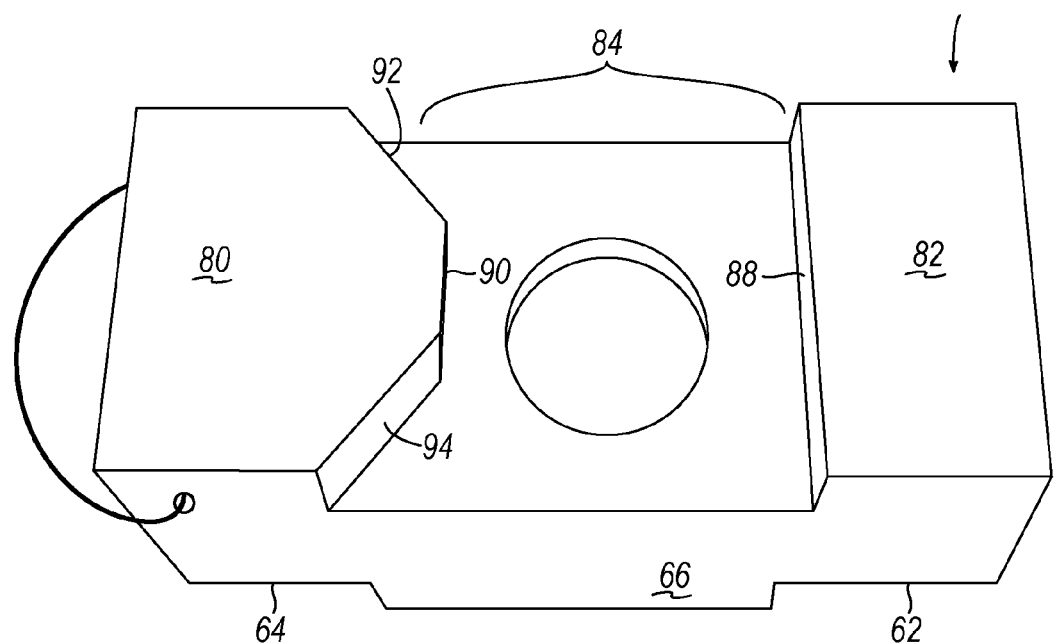
FIG. 7 is an illustrative view of the top of the height extender of FIG. 4.

With further attention to FIG. 6, depending projection 66, of both extenders 60, 60A, has a flat surface 70 extending thereacross from side-to-side of the extender, and opposite, truncated surfaces 72, 74 and 76. These surfaces conform to and are aligned with and compatible with the configurations of surfaces 38, 40 and 42 (FIG. 3) of skate 10 when extenders 60, 60A are placed on skate 10.

Figure 4:
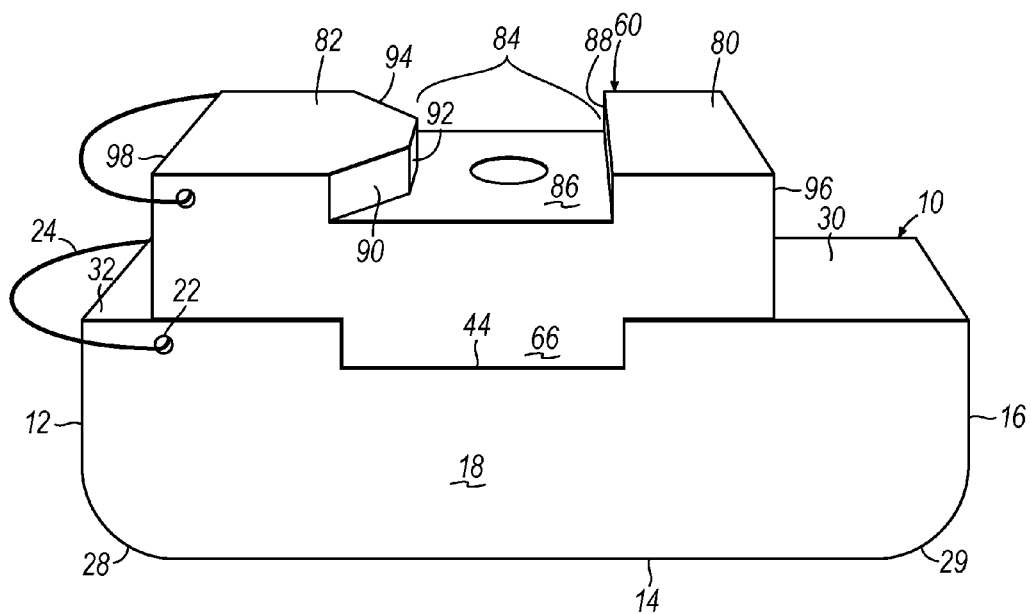
FIG. 4 is an illustrative side view of the invention including a control arm skate and a height extender in combination, with the height extender configured to support a control arm.
Figure 5:
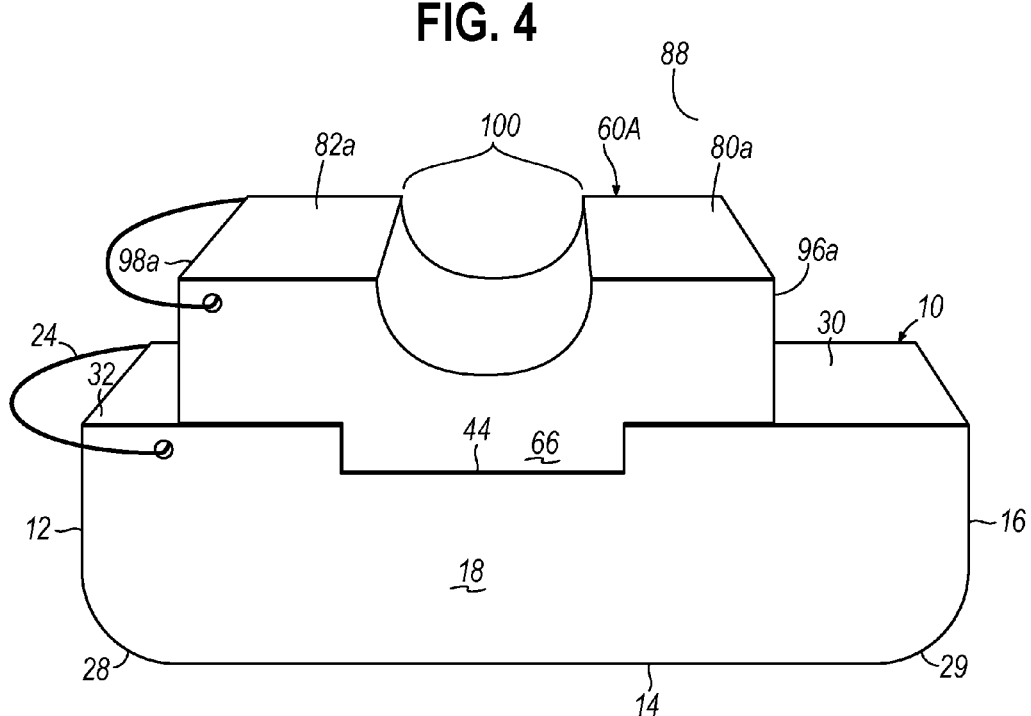
FIG. 5 is an illustrative side view of the invention including a control arm skate and a height extender in combination, with the height extender configured to support an axle.

It will be appreciated the bottom structure shown in FIG. 6 is the same for extender 60 of FIG. 4 and for extender 60A of FIG. 5; while the upper portions of extender 60 (FIG. 8) are the same as the upper portions of skate 10 (FIG. 3).

With reference to FIG. 4, extender 60 has an upper configuration including flat, parallel surfaces 80, 82, separated by a channel 84 across extender 60. Channel 84 has a floor surface 86, parallel to surfaces 80, 82. Moreover, channel 84 is defined by a flat transverse wall 88, and opposite truncated walls 90, 92 and 94 similar to walls 38, 40 and 42 (FIG. 3) of skate 10. In other words, the upper face configuration of extender 60 is preferably like that of the upper face of skate 10 (FIGS. 1-3).

Also, any extender 60, 60A may be, but not necessarily, shorter than the skate 10 as illustrated by ends 96, 98, and is preferably, but not necessarily as wide as skate 10.

When operably combined with a skate 10, surface 64 of extender 60 lies along and in contact with surface 32 of skate 10; surface 62 of extender 60 lies along and in contact with surface 30 of skate 10 and depending projection 66 of extender 60 lies within channel 34 of skate 10.

With reference to FIG. 5, extender 60A is the same as the extender 60 of FIG. 4 with the exception of its upper face configuration comprising flat surfaces 80a, 82a and a semi-cylindrical transverse trough or channel 100 extending across extender 60A. In this, it will be appreciated that channel 100 is particularly configured to receive a cylindrical axle or another frame component of a vehicle.

Like or similar parts of extenders 60, 60A are identified by identical numbers or numbers with an "a" suffix as clearly marked on the figures and as described herein.

It will be appreciated that extenders 60, 60A can be used with a skate 10 in a variety of ways for a plurality of desired results. For example, an extender 60 or 60A can be oriented on a skate 10 to support a vehicle component above skate 10 and higher, relative to a reference surface on which skate 10 sits, than if no extender was used. Thus extender 60 can be used to raise a vehicle component such as a control arm higher than skate 10 alone. Likewise, extender 60A can raise an axle or frame component of a vehicle higher than a skate 10 alone.

Figure 8:
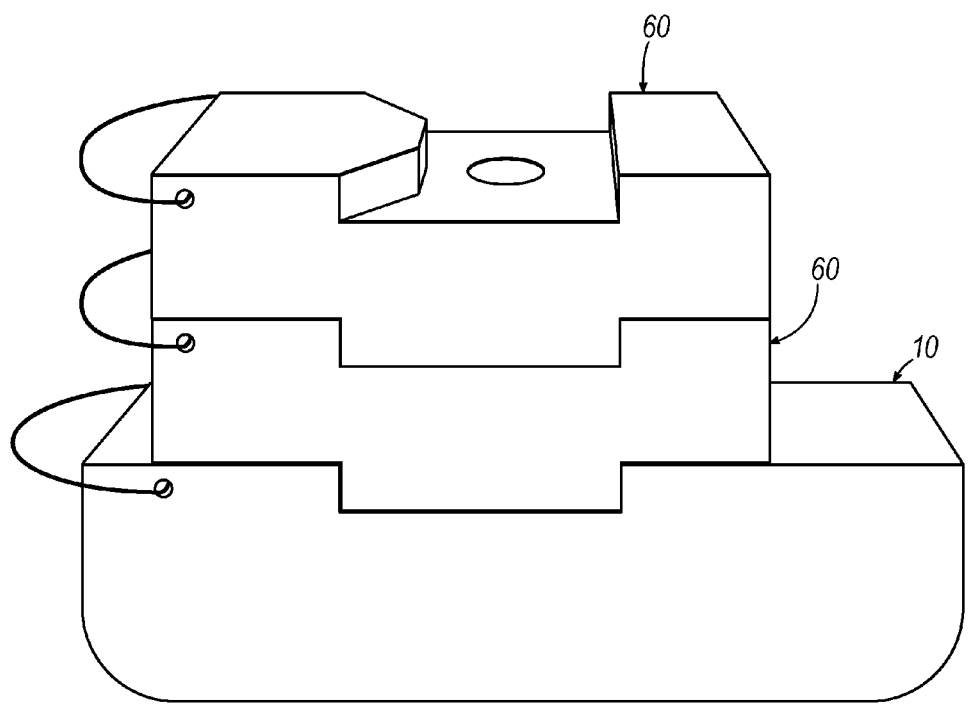
FIG. 8 is an illustration of two height extenders of FIG. 4 stacked on a skate.

Also, a plurality of extenders 60 can be serially or sequentially stacked, one above another, on top of a skate 10, where increased lift heights are desired. An extender 60A may be stacked on skate 10, on top of an extender 60, or on top of a sequential stack of extenders 60 where additional heights are needed. As an example of the stacking variations contemplated herein, FIG. 8 illustrates a height extender 60 stacked on a skate 10 and an extender 60 stacked on extender 60 where the two extenders 60, 60 support a control arm component on skate 10 above a sliding surface (not shown).

Figure 9:
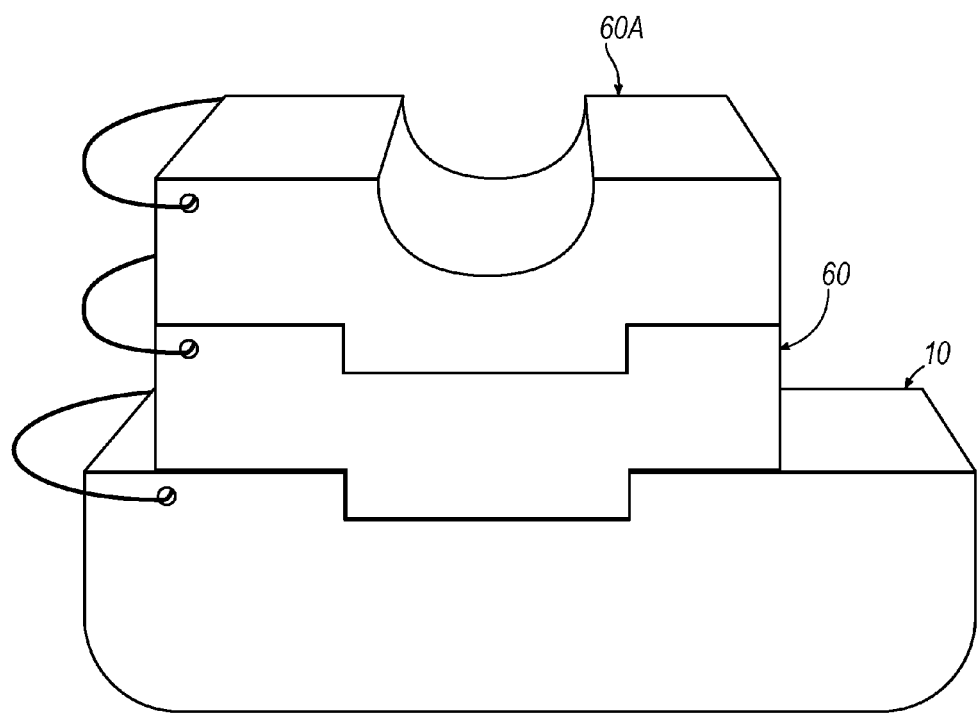
FIG. 9 is an illustrative view of a height extender of FIG. 5 for an axle or frame component as in FIG. 5 stacked onto a height extender of FIG. 4, and above a skate.

FIG. 9 illustrates a height extender 60 stacked on a skate 10, but with a height extender 60A stacked on extender 60 to support an axle on vehicle frame component higher above skate 10 than if extender 60A was stacked directly on skate 10.

Figure 10:
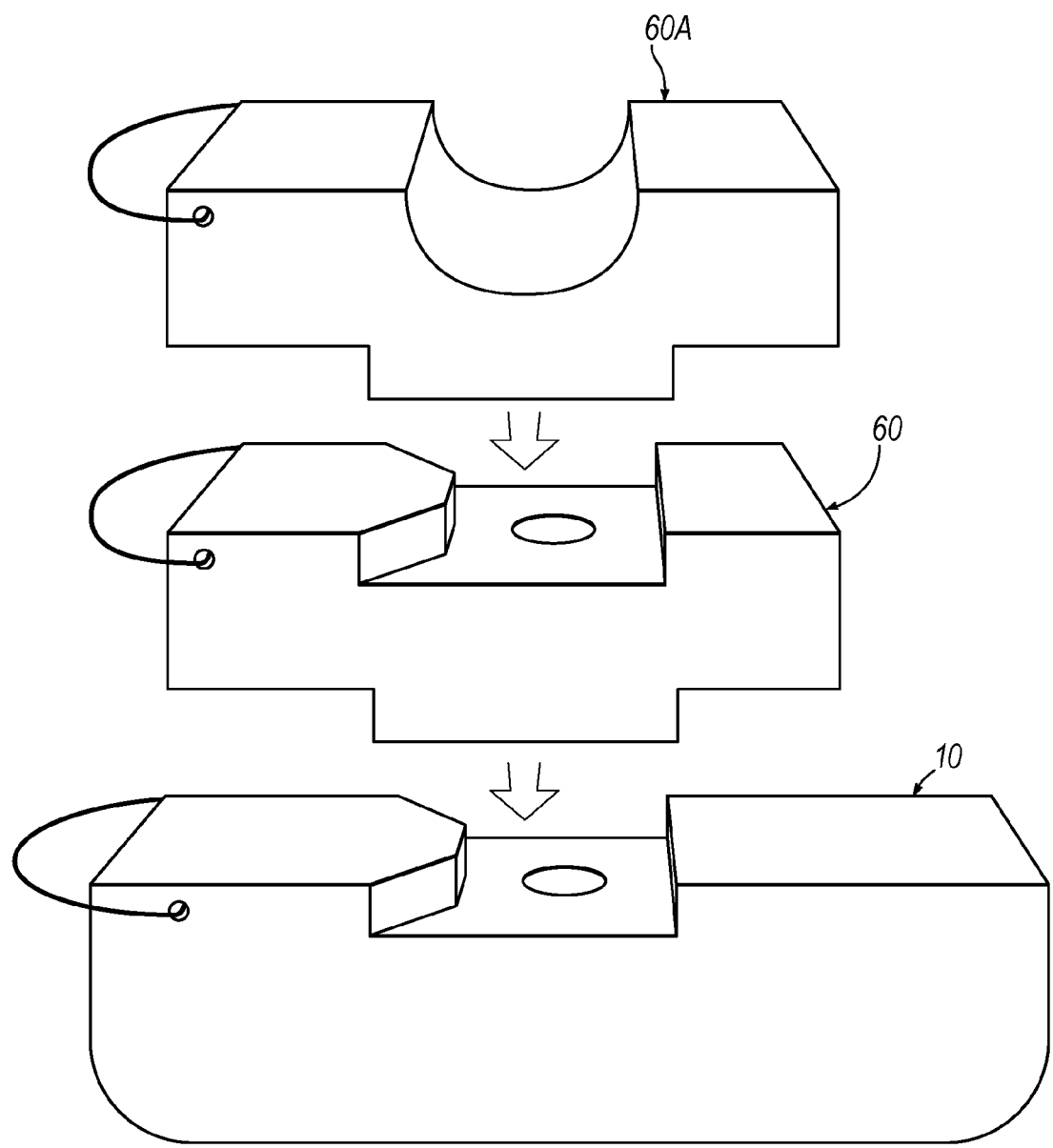
FIG. 10 is an illustration of the disassembled components of FIG. 9 in exploded orientation.
Figure 11:
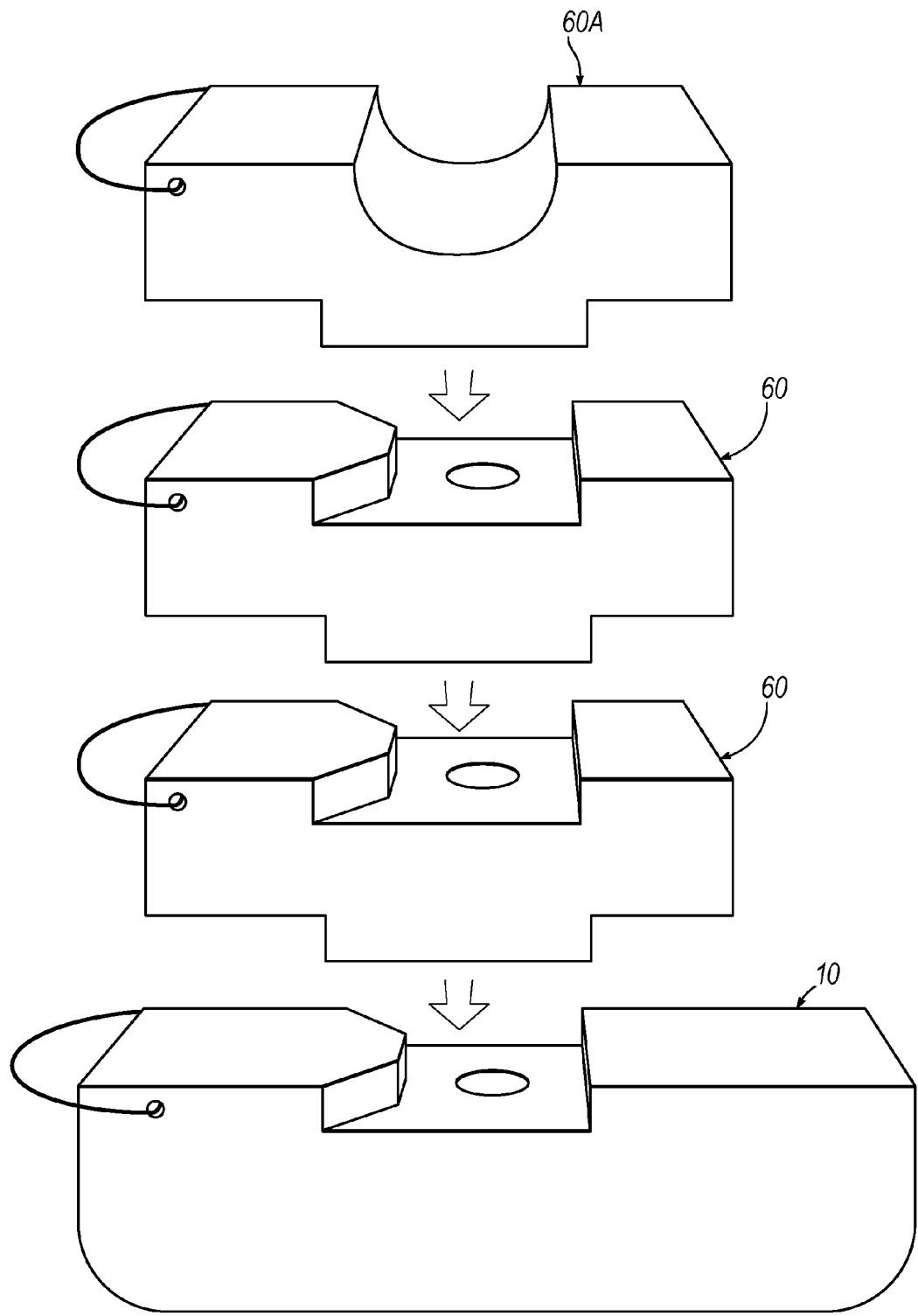
FIG. 11 is an illustration of a disassembled skate and two extenders of FIG. 4 and an extender of FIG. 5, stackable one on the other.

FIG. 11 illustrates a configuration of an extender 60A stacked on two extenders 60 and on skate 10 for raising an axle or vehicle frame component yet higher than that of configuration of FIGS. 9-10.

It will be appreciated that other stack configurations can be performed within the scope of the invention. For example only, and without limitation, an extender 60 can be stacked on two extenders 60 on a skate 10, for example,.

And finally, it will be appreciated that the extenders 60, 60A have bottoms with surfaces configured to cooperate with the top of a skate 10, or the top of an extender 60 in such a way as to prevent backward, forward or lateral movement. These cooperating surfaces serve to lock or abut when the components are stacked together so once stacked, these motions imparted to the skate do not misalign or cause separation of skate and extender or between one extender and another extender stacked therein.

In this regard, note surfaces 62, 64, 68, 70, 72, 74 and 76 on the lower portions of extenders 60, 60A and their cooperation with surfaces 30, 32, 44, 36, 38, 40, 42 of the respective upper surfaces of skate 10 (FIGS. 1 and 3).

In particular, the respective surfaces of the lower portions of the height extenders 60, 60A abut or lie adjacent to the upper surfaces of the height extenders 60 or skate 10 as follows:

surface 70 cooperates with surface 36
surface 62 cooperates with surface 30
surface 64 cooperates with surface 32
surface 76 cooperates with surface 42
surface 74 cooperates with surface 40
surface 72 cooperates with surface 38
surface 68 cooperates with surface 44 with depending projection 66 disposed within and cooperating with channel 34.

In addition, a variety of other extenders, differing in their upper face configurations to support other configurations or forms of vehicle components as needed, can be used in accordance with this invention.

This invention thus contemplates a unique accessory and improvement for vehicle skates, or a combination of skate and accessory for varied vehicle movement circumstances and methods of vehicle movement and support for sliding in a variety of combinations.

What is claimed is:
1. In combination, a vehicle skate and a plurality of height extenders stackable on the vehicle skate for supporting a vehicle component at a vertical height above that when the component is supported by the skate alone.

2. The combination of claim 1 wherein each extender of said plurality of height extenders has a bottom face configured similarly to the bottom face of each other extender.

3. The combination of claim 2 wherein each height extender of said plurality of height extenders has an upper face configured similarly to the upper face of each other height extender of said plurality of height extenders.

4. The combination of claim 2 wherein at least one first extender of said plurality of height extenders is stacked on a second extender of said plurality and has an upper face configured differently than an upper face of the second extender on which the first extender is stacked.

5. The combination of claim 4 further including a plurality of said second extenders stacked sequentially on a skate beneath said first extender.

6. The combination of claim 2 wherein each extender of said plurality of extenders is stacked one above the other on said skate.

7. A method of supporting a vehicle over a surface and including the steps of:
raising the vehicle;
placing a skate, having a plurality of height extenders thereon stacked, under a vehicle component; and
lowering said vehicle and said component onto an upper one of said height extenders stacked thereon.

8. A height extender for use in combination with a vehicle skate and a vehicle component wherein said skate has a bottom surface for engagement with a support surface and an upper face configured for cooperably receiving said vehicle component, said height extender having a lower surface configured to cooperate with the upper face of said skate and an extender upper face configured for cooperably receiving said vehicle component.

9. A height extender as in claim 8 wherein said extender upper face is configured to cooperate with a vehicle control arm.

10. A height extender as in claim 8 wherein said extender upper face is configured to cooperate with a vehicle axle.

11. A pair of height extenders for use in combination with and on a vehicle skate and with a vehicle having a vehicle component wherein said skate has a bottom surface for engagement within a support surface, and an upper face configured for cooperatively receiving a vehicle component wherein each said height extender has a lower surface configured interchangeably to cooperate with said upper face of said skate and an upper face configured to cooperatively receive said vehicle component, said extenders being stackable serially on said skate.

12. In combination, a vehicle skate having a bottom surface for engagement with a support surface and an upper face configured for cooperating with a vehicle control arm component and a plurality of height extenders having a lower surface configured in cooperative relationship with the configuration of the upper face of said skate,
a first one of said plurality of height extenders having an upper face configured identically to the upper face of said skate, and
a second one of said height extenders having an upper face configured to cooperatively receive an axle of a vehicle.

13. The combination of claim 12 wherein said first height extender is stackable on said skate and said second height extender is stackable on said first height extender.

14. The combination of claim 13 further including a third height extender configured like said first extender and stacked on said skate beneath said first height extender stacked thereon.

* * * * *